United States Patent
D'Aluisio et al.

(10) Patent No.: US 8,579,316 B2
(45) Date of Patent: Nov. 12, 2013

(54) BICYCLE FRAME WITH IMPROVED WELD JOINT

(75) Inventors: Christopher P. D'Aluisio, Corralitos, CA (US); Andrew Frasca, Aptos, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 276 days.

(21) Appl. No.: 13/281,210

(22) Filed: Oct. 25, 2011

(65) Prior Publication Data

US 2012/0038129 A1  Feb. 16, 2012

Related U.S. Application Data

(63) Continuation-in-part of application No. 12/548,214, filed on Aug. 26, 2009, now Pat. No. 8,042,822.

(51) Int. Cl.
*B62K 21/02* (2006.01)

(52) U.S. Cl.
USPC .................. 280/279; 280/274; 280/281.1

(58) Field of Classification Search
USPC ............................... 280/274, 281.1
See application file for complete search history.

(56) References Cited

U.S. PATENT DOCUMENTS

| | | | |
|---|---|---|---|
| 2,453,061 A | 11/1948 | Bissout et al. | |
| 4,583,755 A | 4/1986 | Diekman et al. | |
| 4,813,591 A | 3/1989 | Mueller et al. | |
| 5,056,704 A | 10/1991 | Martin et al. | |
| 5,363,715 A | 11/1994 | Huggins et al. | |
| 6,123,353 A | 9/2000 | Bennett et al. | |
| 6,365,865 B1 | 4/2002 | Kurokawa | |
| 6,375,210 B1 | 4/2002 | Lam | |
| 6,481,522 B1 | 11/2002 | Adachi | |
| 6,874,676 B1 | 4/2005 | Elkouh et al. | |
| 6,889,992 B2 | 5/2005 | Vroomen et al. | |
| 2008/0100029 A1 | 5/2008 | Hu | |
| 2010/0320721 A1 | 12/2010 | Chung | |

FOREIGN PATENT DOCUMENTS

FR  757201  12/1933

*Primary Examiner* — Tony Winner
(74) *Attorney, Agent, or Firm* — Michael Best & Friedrich LLP

(57) ABSTRACT

A bicycle frame comprising a first tubular member having a first main portion and a first interface portion (e.g., a rounded taper), and a second tubular member having a second main portion and a second interface portion engaged with the first interface portion to create a joint. The joint includes a peripheral channel defined between the first interface portion and the second interface portion, and a weld is positioned in the peripheral channel. The second interface portion is defined at least partially by a substantially flat face wall. Preferably, the first tubular member includes an open end at the first interface portion, while the flat face wall at the second interface portion is substantially closed. In addition, it is preferred that the face wall lies in a plane that is substantially parallel to a longitudinal axis of the head tube (e.g., within ten degrees of the longitudinal axis).

10 Claims, 7 Drawing Sheets

BICYCLE FRAME WITH IMPROVED WELD JOINT

BACKGROUND

The present invention relates to bicycle frames, and particularly to weld joints of tubular bicycle frames.

Bicycle frames are commonly manufactured from tubes that are coupled together into a desired configuration. When the tubes are metal (e.g., steel, aluminum, titanium, etc.), they can be welded together to form the bicycle frame. When manufacturing a welded bicycle frame, the ends of the tubes are pre-cut so that the tubes fit together to form pre-weld joints between the tubes. For example, one tube can be mitered so that it wraps snugly around the tube to which it will be welded. When tubes of similar size are coupled using a mitered joint, the geometry of the joint varies dramatically around the tube interface, from essentially a T-joint at the top and bottom to essentially a tangent joint on the sides, with the mitered tube having a razor thin wall thickness at the tangent joint.

When welding tubes having mitered joints, a weld fillet is formed around the joint. Due to the varying joint geometry of the above-described mitered joint, creating a good, consistent weld is very difficult. At the location where the tubes are tangent, the weld bead commonly protrudes substantially above the surfaces of the tubes being welded. If a smooth joint is desired, one would need to grind or sand the weld bead.

SUMMARY

The present invention relates to an improved weld joint structure between two parts. This improved joint structure is designed to make the weld bead more flush with the outer surfaces of the parts being welded to give the appearance of a smooth transition between the outer surfaces of the parts, and to reduce or eliminate post-weld finishing operations, such as grinding or sanding.

The invention provides a bicycle frame comprising a first tubular member having a first main portion and a first interface portion (e.g., a rounded taper), and a second tubular member having a second main portion and a second interface portion engaged with the first interface portion to create a joint. The joint includes a peripheral channel defined between the first interface portion and the second interface portion, and a weld is positioned in the peripheral channel. The second interface portion is defined at least partially by a substantially flat face wall.

In one embodiment, the channel has a channel depth that is greater than a wall thickness of the first tubular member. For example, a ratio of the channel depth to the wall thickness can be at least 1.5:1, and is preferably at least 2:1.

Preferably, the first tubular member includes an open end at the first interface portion, while the flat face wall at the second interface portion is substantially closed. In addition, it is preferred that the face wall lies in a plane that is substantially parallel to a longitudinal axis of the head tube (e.g., within ten degrees of the longitudinal axis).

It is anticipated that some aspects of this invention are applicable to bicycle components other than frames. Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
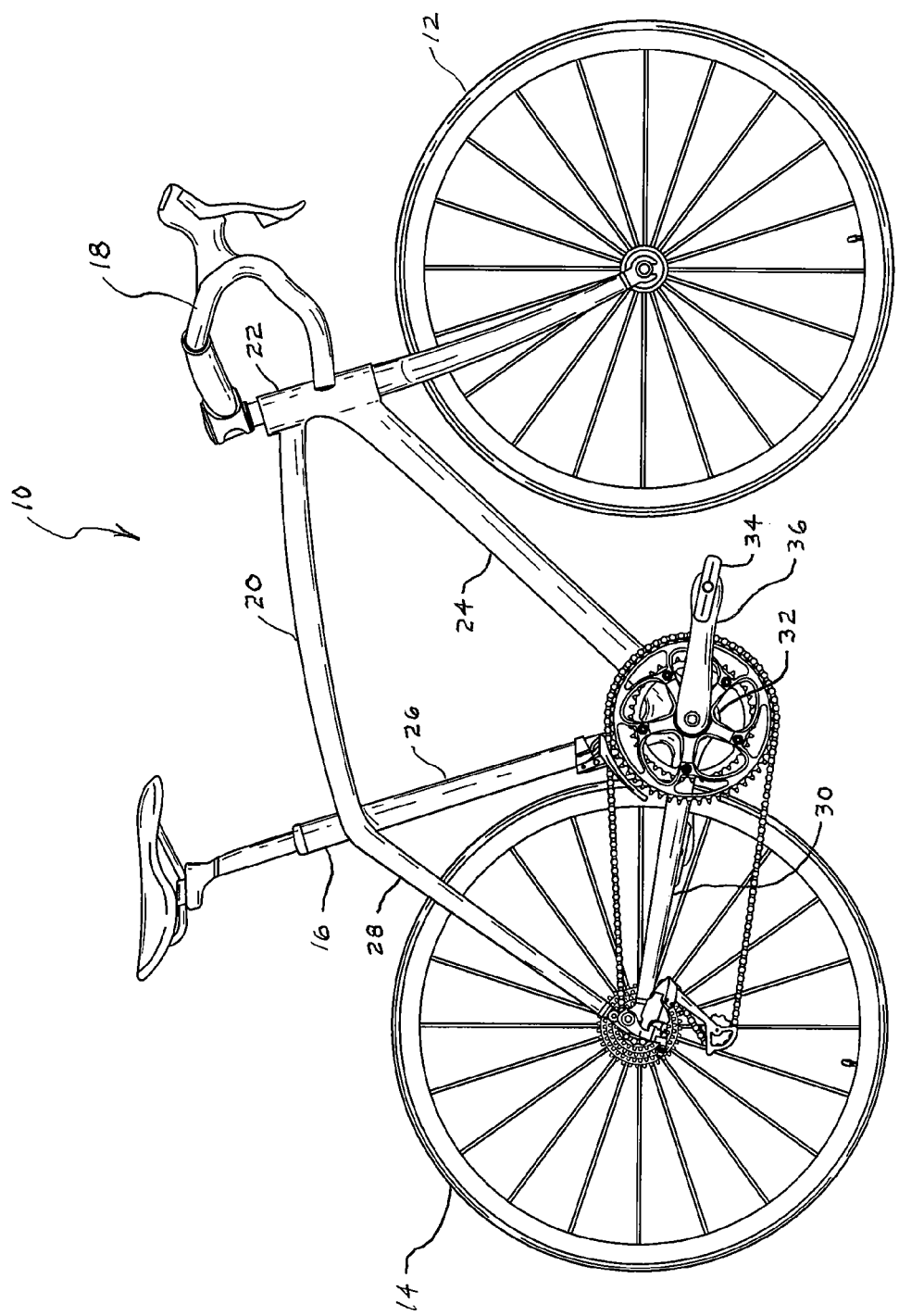
FIG. 1 is a side view of a bicycle including a welded frame having features of the present invention.

FIG. 1 illustrates a bicycle 10 that includes a front wheel 12, a rear wheel 14, a frame 16, and a steering assembly 18. The frame 16 includes a top tube 20, a head tube 22, a down tube 24, a seat tube 26, seatstays 28, chainstays 30, and a bottom bracket 32. Pedals 34 are attached to a crankset 36 to allow a user to rotate the crankset 36 and to propel the bicycle 10, as is known in the art.

Figure 2:
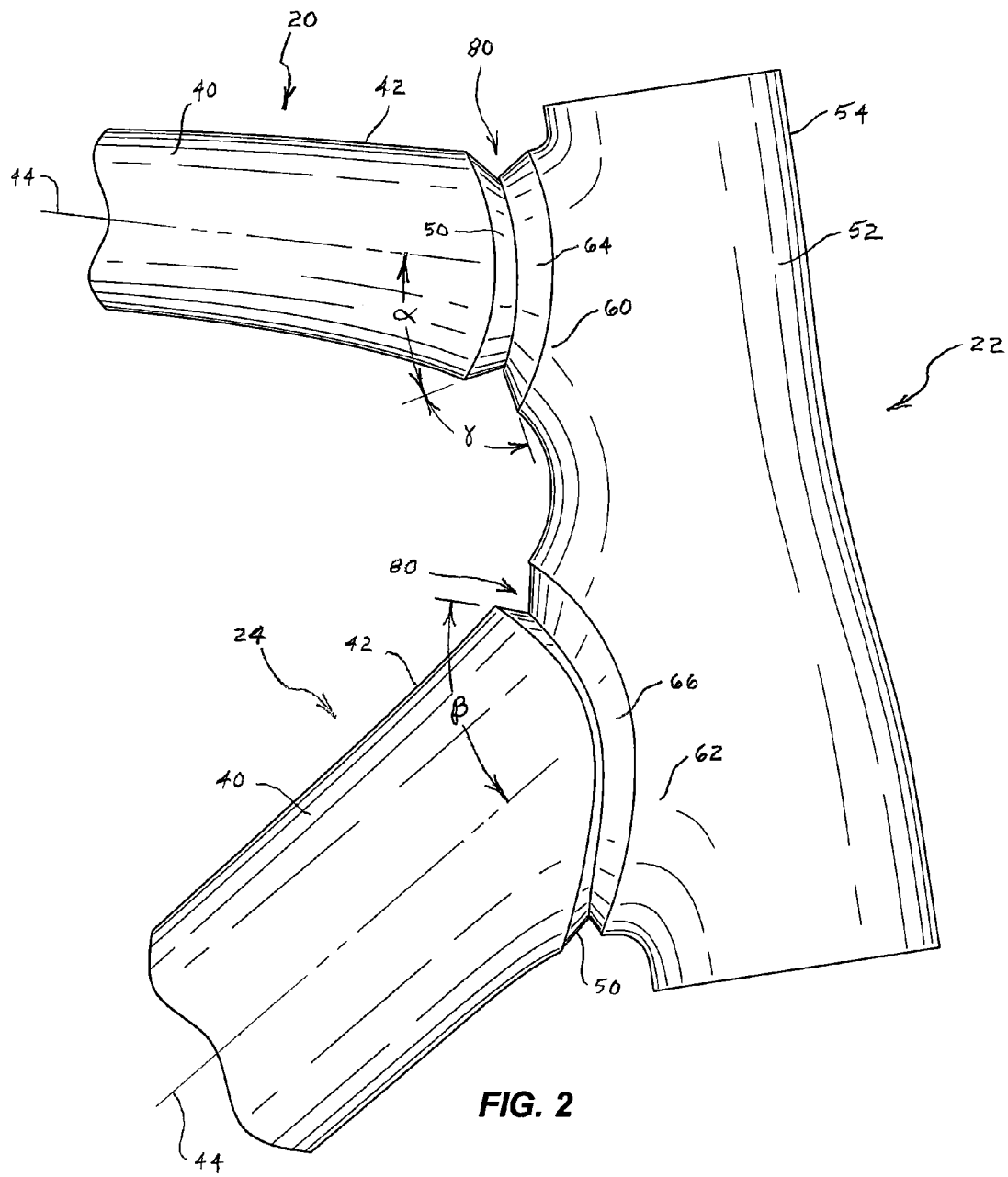
FIG. 2 is an enlarged partial side view of a portion of the frame prior to welding.
Figure 3:
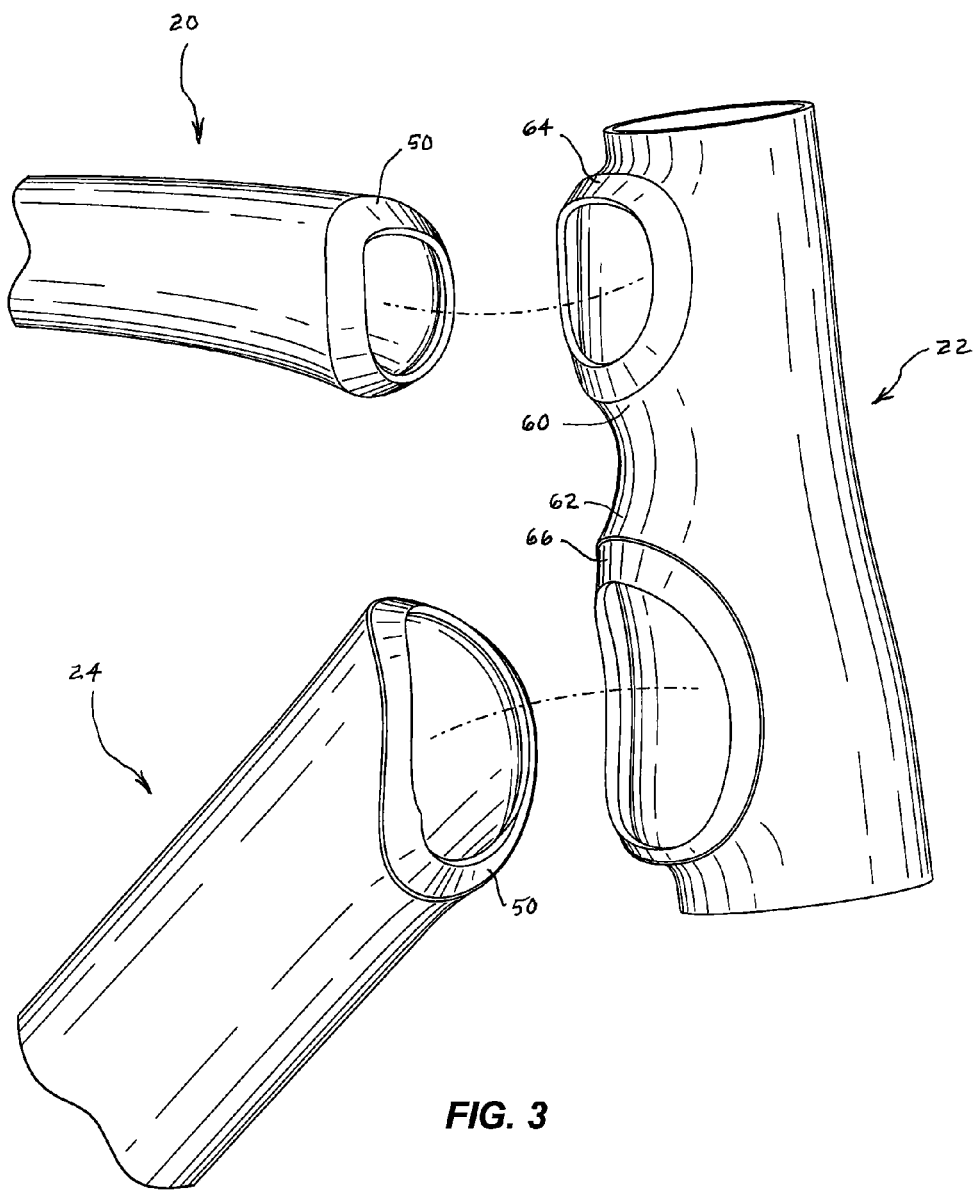
FIG. 3 is an exploded perspective view of the portion of the frame depicted in FIG. 2.

FIG. 2 is an enlarged side view of the head tube 22 and portions of the top tube 20 and down tube 24 prior to those tubes being secured together. Each of the top tube 20 and down tube 24 includes a main portion 40 having a generally smooth outer surface 42 that is generally parallel to a longitudinal axis 44 of the tube. The illustrated main portions 40 are generally circular or oval in cross section. However, the present invention is not limited to tubes having circular or oval cross sections, but is applicable to tubes having a variety of cross sections.

The end of each of the top tube 20 and down tube 24 includes an interface portion in the form of a tapered portion 50 that extends at an angle relative to the main portion 40 of each tube. The angle of the tapered portion 50 varies depending on the position around the perimeter of the tube. In this illustrated embodiment, the angle α of the tapered portion 50 of the top tube 20 relative to the longitudinal axis 44 of the top tube 20 varies from about 27 degrees to about 51 degrees. The angle β of the tapered portion 50 of the down tube 24 relative to the longitudinal axis 44 of the down tube 24 varies from about 8 degrees to about 66 degrees.

With continued reference to FIG. 2, the head tube 22 comprises a main portion 52 having an outer surface 54 that generally mimics a cylindrical and/or slightly frustoconical configuration. The head tube 22 further includes an upper fillet surface 60 that is designed to provide a smooth transition from the outer surface 54 of the head tube 22 to the outer surface 42 of the main portion 40 of the top tube 20. The head tube 22 also includes a lower fillet surface 62 that is designed to provide a smooth transition from the outer surface 54 of the head tube 22 to the outer surface 42 of the main portion 40 of the down tube 24. More specifically, the upper and lower fillet surfaces 60, 62 are designed to mimic a weld fillet that would appear if substantially straight tubes were welded together (e.g., using a mitered joint) and sanded to provide a smooth, radiused transition between the head tube 22 and the top and down tubes 24, respectively, thus giving the appearance of a molded frame 16.

The head tube 22 further includes an upper tapered portion 64 extending at an angle from the upper fillet surface 60, and a lower tapered portion 66 extending at an angle from the lower fillet surface 62. The upper and lower tapered portions 64, 66 are designed to fit with the tapered portions 50 of the top tube 20 and down tube 24, respectively, to form pre-weld joints. The angle of the upper and lower tapered portions 64, 66 varies around the perimeter of the upper and lower fillet surfaces 60,62. In the illustrated embodiment, the angle of the upper tapered portion 64 is about 36 degrees to about 91 degrees relative to the longitudinal axis 44 of the top tube 20. The angle of the lower tapered 66 portion varies from about 30 degrees to about 59 degrees relative to the longitudinal axis 44 of the down tube 24.

Figure 4:
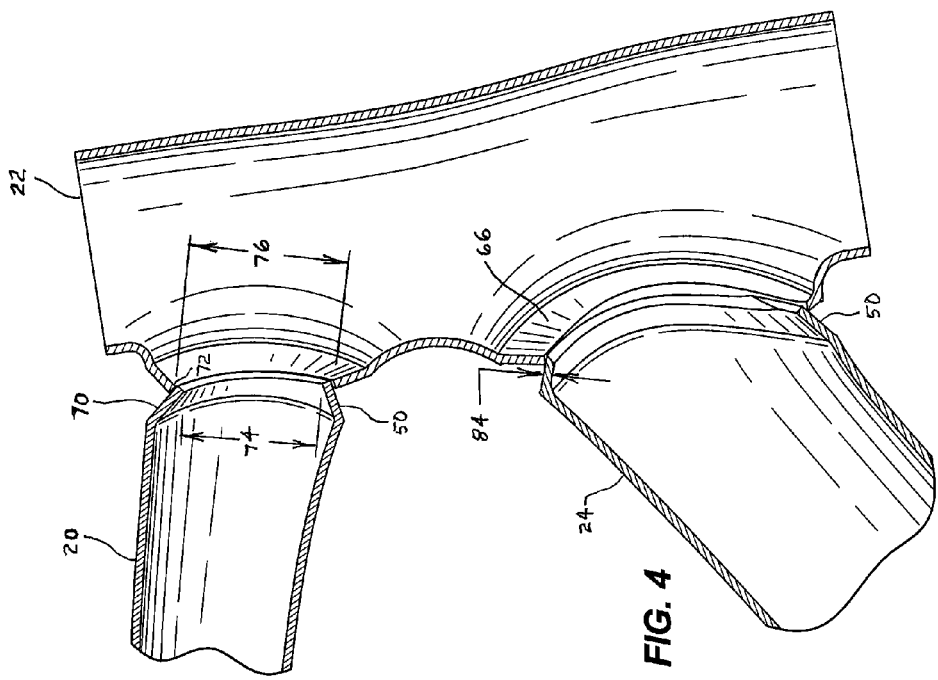
FIG. 4 is a section view of the portion of the frame depicted in FIG. 2.

Referring to FIG. 4, the end of the tapered portion 50 of the top tube 20 fits inside the end of the upper tapered portion 64 of the head tube 22. In other words, an outer surface 70 of the tapered portion 50 of the top tube 20 engages an inner edge 72 or surface of the upper tapered portion 64. In this regard, it can be seen that an inner dimension 74 of the tapered portion 50 of the top tube 20 is smaller than a corresponding inner dimension 76 of the upper tapered portion 64. Similarly, the end of the tapered portion 50 of the down tube 24 fits within the end of the lower tapered portion 66 of the head tube 22. This configuration provides for a relatively secure dry fit between the tubes prior to the welding operation, which facilitates the proper alignment and positioning of the tubes relative to each other. The above-described arrangement could be reversed, with one or both of the upper and lower tapered portions 64, 66 fitting inside the corresponding tapered portion 50 of the top tube 20 and down tube 24, respectively. However, it is considered desirable to have the thinner tube (i.e., the top tube and down tube in the illustrated embodiment) positioned inside the thicker tube (i.e., the head tube in the illustrated embodiment).

With further reference to FIGS. 2 and 4, the above-described configuration of top tube 20, down tube 24, and head tube 22 results in creation of a peripheral channel 80 around the joint between the top tube 20 and head tube 22 and the joint between the down tube 24 and head tube 22. These channels 80 are dimensioned such that the cross-sectional area of each channel (i.e., the triangular region defined by the tapered portions) does not vary substantially around the perimeter of the joint. The result is a substantially uniform cross-section weld joint that is easier to weld. With skilled welders, it is believed that welding of these joints can result in a near finished products, with the weld bead substantially flush with the adjacent surfaces, thus requiring little or no grinding, filing, or sanding.

The illustrated peripheral channels 80 are substantially V-shaped, and an angle γ at the base of the channel varies between about 80 degrees and about 96 degrees. In the illustrated embodiment, the channels have a depth 82 that is greater than the wall thickness 84 of the tubes being welded. For example, the depth 82 (FIG. 5) of the channel between the top tube 20 and head tube 22 is about 5 millimeters, and a wall thicknesses 84 of the top tube and head tube at the joint (i.e., the interface portions) are about 2 mm and 2.5 mm, respectively. In this configuration, the ratio between the channel depth and the tube wall thickness is about 2.5:1 for the top tube and about 2:1 for the head tube.

It should be understood that the channels do not need to have straight sidewalls, but instead could have curved sidewalls, such as when the tube ends are domed.

Figure 5:
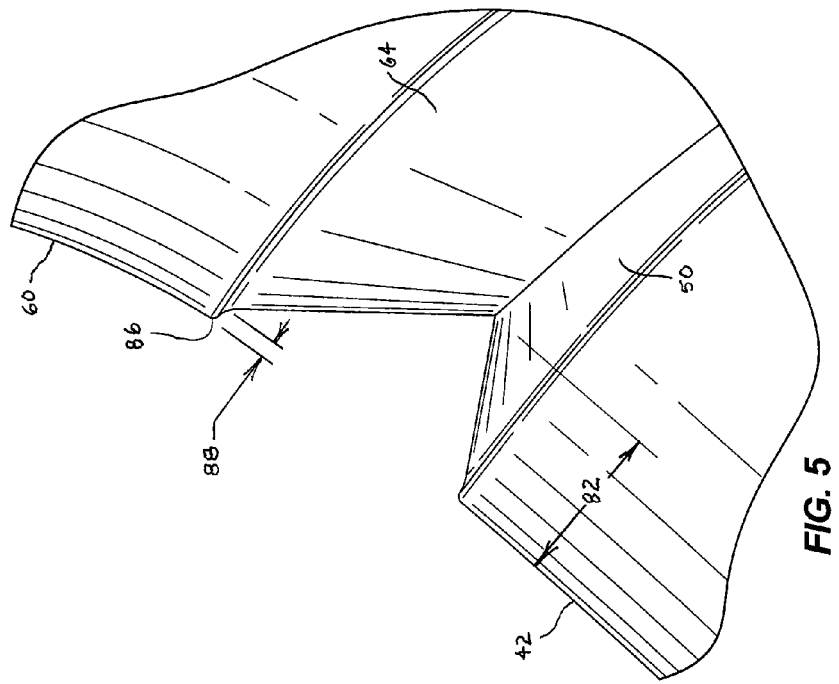
FIG. 5 is an enlarged view of one of the joints shown in FIG. 2.

FIG. 5 illustrates an enlarged view of one of the V-shaped channels 80 created by the above-described tapered portions 50, 64. This enlarged view shows that the illustrated tapered portions 50, 64 do not extend directly from the ends of the outer surfaces 42, 60 of the tubes. Rather, each tapered portion 50, 64 is offset such that there is a shoulder 86 between the outer surfaces 42, 60 and the tapered portions 50, 64. The illustrated shoulder 86 is radiused, but could instead be straight. The illustrated shoulder has a shoulder depth 88 of about 0.5 mm, thus creating shoulder depth 88 to wall thickness ratio of about 1:3. This offset between the tapered portions 50, 64 and the outer surfaces 42, 60 provides a guide for the welder, thus facilitating a better weld. It should be understood that the shoulder could be sized differently from the described embodiment, or the shoulder could be eliminated entirely without detracting from certain aspects of the present invention.

Figure 6:
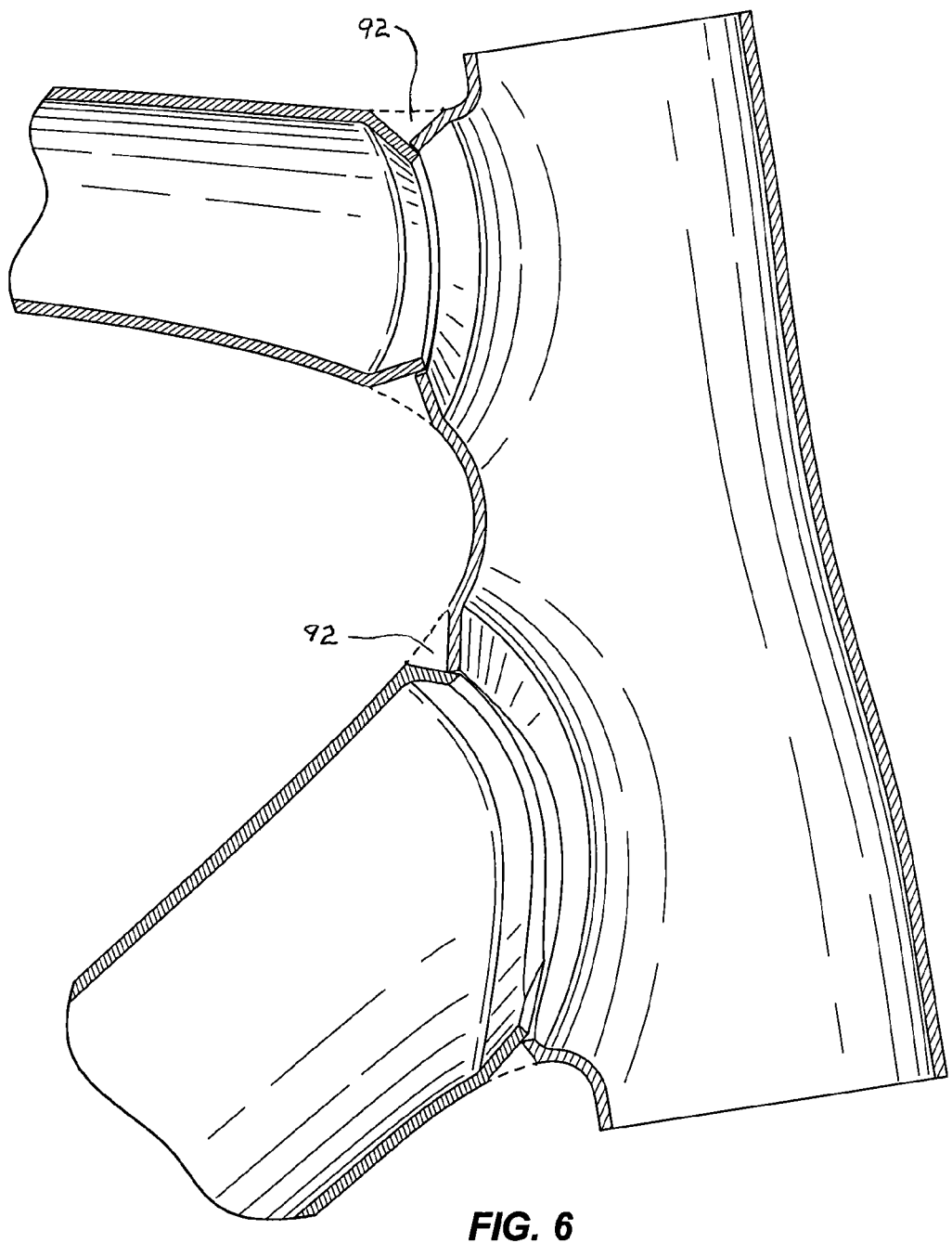
FIG. 6 is the section view of FIG. 4 after the tubes are welded together.

FIG. 6 illustrates weld beads 92 (in broken lines) after the joints are welded. As illustrated, the weld beads 92 are substantially flush, or might protrude slightly outward from the joint beyond the outer surfaces of the tubes. The weld 92 can then be finished (e.g., ground, filed, sanded, etc.), if necessary, until it is flush with the outer surfaces of the tubes. The result is a welded bicycle frame that, once painted, will look like a single-piece molded bicycle frame.

Figure 7:
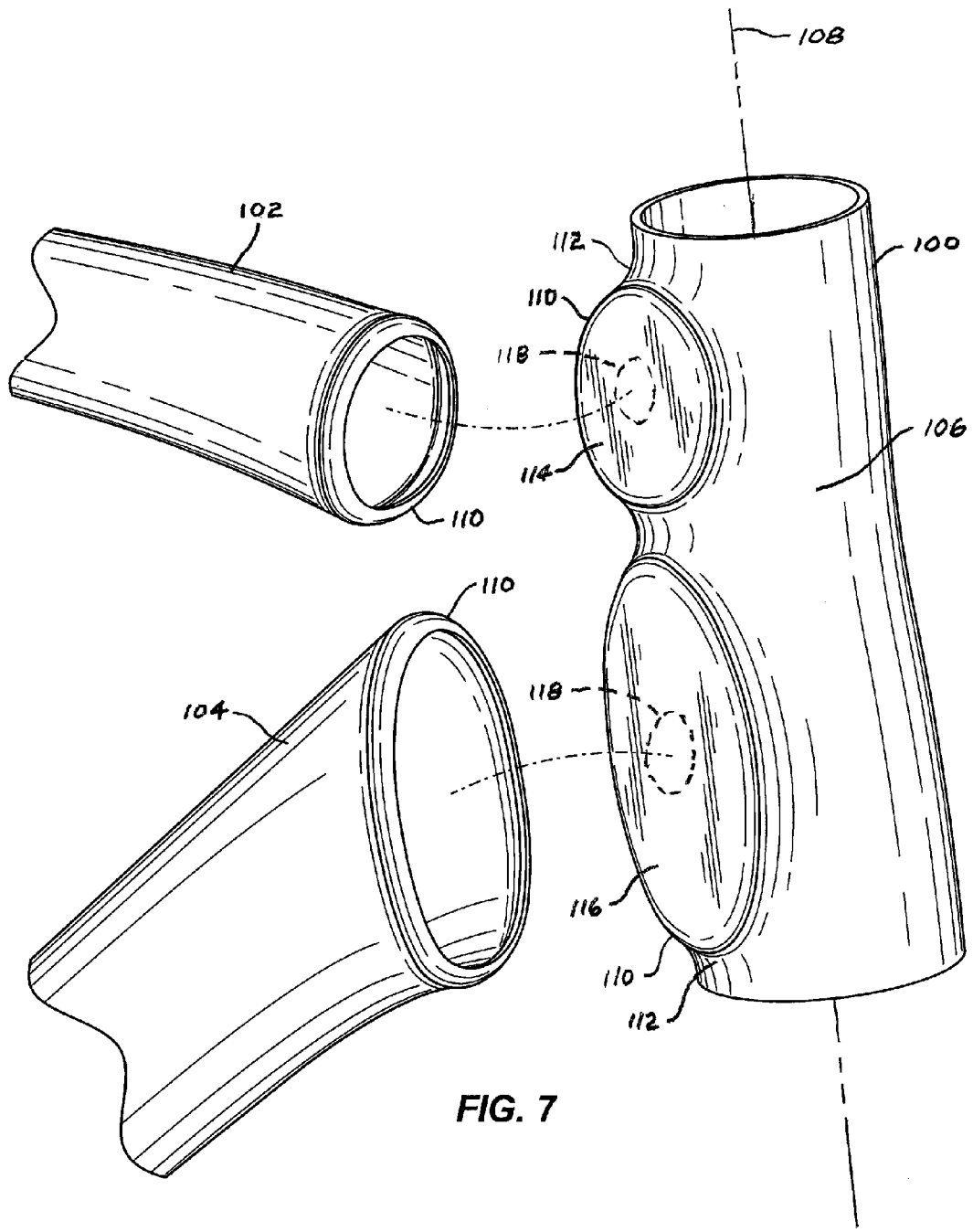
FIG. 7 is an exploded perspective view of a portion of a bicycle frame of a second embodiment of the present invention.
Figure 8:
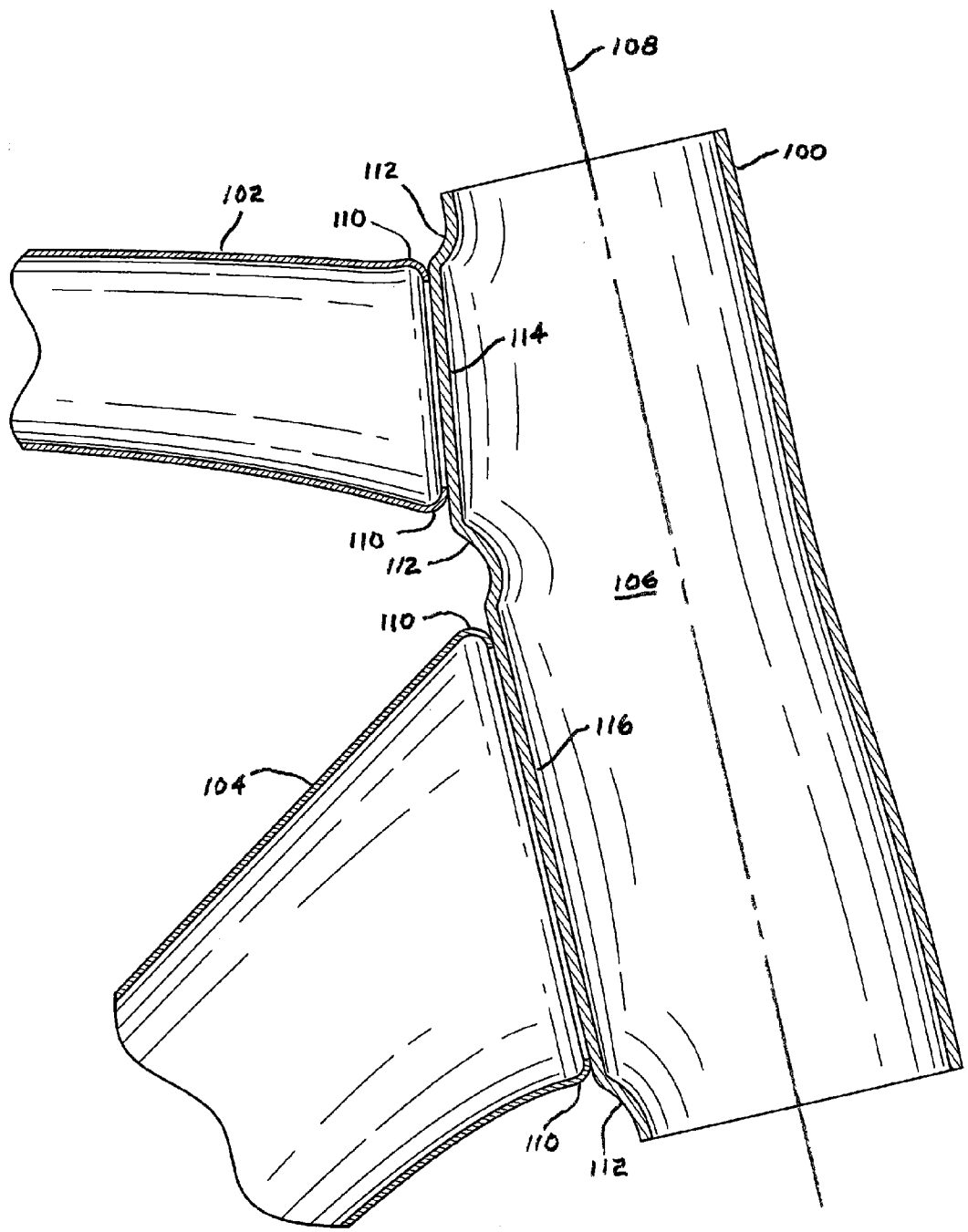
FIG. 8 is a section view of the frame illustrated in FIG. 7.

FIGS. 7 and 8 illustrate a second embodiment of the present invention including a head tube 100, a top tube 102, and a down tube 104. The head tube 100 has a main portion 106 that defines a longitudinal axis 108. The second embodiment is similar to the embodiment of FIGS. 2-6 in that, inter alia, wall thicknesses of the top tube 102 and down tube 104 are less than the wall thickness of the head tube 100, and the tapered portions of the tubes define a channel that is deeper than the wall thicknesses of the tubes. The embodiments differ in that, inter alia, the tapered portions 110 of the first tubular members of the second embodiment are more rounded, and the tapered portion 110 of the second embodiment are not offset by the previously-described shoulder 86 and shoulder depth 88. In addition, fillet surfaces 112 of the head tube 100 of the second embodiment transition to substantially flat, upper and lower face walls 114, 116, the outer perimeter of which at least partially define the tapered portion 110 that acts as a weld interface between the head tube 100 and the corresponding top tube 102 or down tube 104.

In the illustrated embodiment, the upper and lower face walls 114,116 are substantially parallel (i.e., +/−15 degrees) to the longitudinal axis 108 of the head tube 100. Specifically, the upper face wall 114 is positioned at an angle of about 9 degrees relative to the longitudinal axis 108, and the lower face wall 116 is positioned and an angle of about zero degrees relative to the longitudinal axis 108. In addition, the illustrated face falls 114,116 are substantially solid or closed and do not have an opening extending into the interior of the head tube 100. In an alternative embodiment, the flat face walls 114,116 can have openings 118 (shown in broken lines in FIG. 7) that provide communication between the interior of the top tube 102 and/or down tube 104 and the interior of the head tube 100.

Various features and advantages of the invention are set forth in the following claims.

The invention claimed is:

1. A bicycle frame comprising:
a first tubular member having a first main portion and a first interface portion;
a second tubular member having a second main portion and a second interface portion engaged with the first interface portion to create a joint, wherein the joint includes a peripheral channel defined between the first interface portion and the second interface portion, and wherein the second interface portion is defined at least partially by a substantially flat face wall; and a weld positioned in the peripheral channel.

2. A bicycle frame as claimed in claim 1, wherein the first interface portion comprises a rounded tapered portion.

3. A bicycle frame as claimed in claim 1, wherein the channel has a channel depth that is greater than a wall thickness of the first tubular member.

4. A bicycle frame as claimed in claim 1, wherein the first tubular member has a wall thickness, and where a ratio of the channel depth to the wall thickness is at least 1.5:1.

5. A bicycle frame as claimed in claim 4, wherein the ratio is at least 2:1.

6. A bicycle frame as claimed in claim 1, wherein the wall thickness of the first interface portion is thinner than a wall thickness of the second interface portion.

7. A bicycle frame as claimed in claim 1, wherein the first tubular member includes an open end at the first interface portion, and wherein the flat face wall at the second interface portion is substantially closed.

8. A bicycle frame as claimed in claim 1, wherein the first tubular member further includes a fillet surface between the second main portion and the second interface portion.

9. A bicycle frame as claimed in claim 1, wherein the face wall lies in a plane that is substantially parallel to a longitudinal axis of the head tube.

10. A bicycle frame as claimed in claim 9, wherein the plane is within ten degrees of the longitudinal axis.

* * * * *